United States Patent
Yasuki et al.

(10) Patent No.: US 6,285,407 B1
(45) Date of Patent: Sep. 4, 2001

(54) MULTI-FUNCTION TV RECEIVER

(75) Inventors: Seijiro Yasuki; Kiyoshi Hoshino, both of Kanagawa-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/032,023

(22) Filed: Feb. 27, 1998

(30) Foreign Application Priority Data

Feb. 27, 1997 (JP) ................................................ 9-043519

(51) Int. Cl.[7] ................................. H04N 7/00; H04N 7/08; H04N 3/27; H04N 9/74
(52) U.S. Cl. ......................... 348/554; 348/554; 348/584; 348/460; 348/468; 348/473; 348/552
(58) Field of Search ........................ 345/327; 348/12, 348/13, 7, 460–1, 465, 468, 473–4, 552–554, 584; 455/5.1, 4.2; H04N 7/16, 7/173

(56) References Cited

U.S. PATENT DOCUMENTS

| | | | |
|---|---|---|---|
| 5,410,326 | 4/1995 | Goldstein | 348/134 |
| 5,570,295 * | 10/1996 | Isenberg et al. | 364/514 |
| 5,734,835 * | 3/1998 | Selker | 395/200.79 |
| 5,778,181 * | 7/1998 | Hidary et al. | 395/200.48 |
| 5,832,223 * | 11/1998 | Hara et al. | 395/200.47 |
| 5,844,552 * | 12/1998 | Gaughan et al. | 345/327 |
| 5,929,849 * | 7/1999 | Kikinis | 345/327 |
| 5,969,715 * | 10/1999 | Dougherty et al. | 345/327 |
| 6,018,768 * | 1/2000 | Ullman et al. | 709/218 |
| 6,025,837 * | 2/2000 | Matthews, III et al. | 345/327 |

FOREIGN PATENT DOCUMENTS

| | | |
|---|---|---|
| 0673164A1 | 9/1995 | (EP) . |
| 0723369A1 | 7/1996 | (EP) . |
| 9423537 | 10/1994 | (WO) . |
| 9634466 | 10/1996 | (WO) . |
| 9712486 | 4/1997 | (WO) . |
| 9722207 | 6/1997 | (WO) . |

* cited by examiner

Primary Examiner—Reinhard J. Eisenzopf
Assistant Examiner—Paulos Natnael
(74) Attorney, Agent, or Firm—Pillsbury Winthrop LLP

(57) ABSTRACT

A multi-function TV receiver capable of performing the processing related to an object transmitted through the broadcasting and an object which is derived from accessible means other than the broadcasting and improving utility value for users and (broadcasting station) providers and achieving convenience. A first object data multiplexed in the vertical blanking interval is captured by communication means of a tuner 112 and a VBI decoder 120. A second object data which is used in a network including servers is captured by communication means of a CPU 133 and a modem 131. An linking operation associated the first and the second object data is executed by linking means using an I/O interface 137, a graphic controller 135, memories 134 and 136, a received optical data processor 138, a specification table 142, etc.

2 Claims, 15 Drawing Sheets

EXAMPLE OF OBJECT

| SCRIPT |
| TEXT DATA |
| PICTURE DATA |
| LAYOUT CONTROL DATA |
| SERVER ADDRESS (1) |
| SERVER ADDRESS (2) |
| ⋮ |

FIG. 7(A)

EXAMPLE OF OBJECT DATA ON MEMORY CARD 140

| BUTTON DATA (1) | LINKING DESTINATION ADDRESS OF NEXT PROGRAM |
|---|---|
| BUTTON DATA (2) | DATA STORAGE AREA |
| LINKING DESTINATION ADDRESS (1) | |
| LINKING DESTINATION ADDRESS (2) | |
| LINKING DESTINATION ADDRESS (3) | |
| SCRIPT | |

FIG. 7(B)

MULTI-FUNCTION TV RECEIVER

FIELD OF THE INVENTION

The present invention generally relates to a multi-function TV receiver, and more particularly, to a multi-function TV receiver capable of analyzing and processing received scripts.

BACKGROUND OF THE INVENTION

In recent years, many devices that have the ability of accessing the Internet, which is an external network, have been developed as electrical home appliances, with the recent progress of semiconductor technology. For example, contain types of TV receivers incorporate a high-performance central processing unit (CPU). Hereinafter, this kind of TV receiver will be referred to as Internet TV receiver. The Internet TV receiver accommodates therein a CPU and a modulator-demodulator (hereinafter referred to as modem). Thus the Internet TV receiver is not only able to receive TV programs in common with conventional TV receivers, but also able to access Internet servers. The Internet TV receiver is thus capable of utilizing information services for browsing a package of one or more files including downloadable software programs, and others of documents, voices, pictures, etc. which are provided through WWW (World Wide Web) servers, electronic mail services through Internet, etc. In this specification, the package and the electronic mail data will be simply referred to as Internet information.

FIG. 14 shows a configuration of conventionally contemplated Internet TVs. In FIG. 14, TV signals carried by broadcast waves are received through a receiving antenna 10. The input signal is applied into a tuner 12 for a channel selection and a demodulation of signals of the selected channel. Baseband signals obtained by the demodulation comply with, for instance, the NTSC format in Japan. The baseband signal is applied to an NTSC decoder 13 for decoding therefrom a luminance signal and a chrominance signal.

A conventional TV receiver is in the structure as described above. In case of Internet TV receivers, there is provided a display mode changer 14 for selectively displaying a conventional TV program or an image which corresponds to Internet information. When a TV receiver is set in the mode to display conventional TV programs, the display mode changer 14 selectively introduces the luminance signal or the chrominance signal from the NTSC decoder 13 to an output terminal 15 for displaying it on a display (not shown) connected to the output terminal 15.

On the other hand, Internet information is received to a TV receiver through public lines such as telephone lines etc. ISDN (Integrated Service Digital Network) lines, CATV lines, etc. The Internet information received through an input terminal 21 is applied to a modem 22. The modem 22 is capable of receiving or transmitting data. The modem 22 is connected to a system bus 23 for receiving or transmitting data under the control of a CPU 24. The CPU 24 performs a data processing and a control of associated circuits blocks based on a stored program, i.e., software stored in a memory 25. If decoded data is for display control, the CPU 24 supplies the data to a graphic controller 26. The graphic controller 26 supplies video signals to the display mode changer 14 through a video memory 27. When a TV receiver is set in a mode to display Internet information, the display mode changer 14 selects video signals from the video memory 27 and leads out to a display unit (not shown) via the output terminal 15. Thus, the Internet information is displayed on the display unit.

An input/output interface (I/O interface) 28 is connected to the system bus 23. The I/O interface 28 is possible to perform the channel selection, a picture quality adjustment, a display mode switching, etc.

Further, the system bus 23 is connected with a received optical data processor 29. The received optical data processor 29 receives and processes transmitted from a remote controller 30. Subsequently the received optical data processor 29 is able to change over the system operating functions to modes suitable for the user's operation. The control signal in response to user's operation is supplied to the control ends of the tuner 12, the NTSC decoder 13, the display mode change 14, etc.

In addition, there is such an Internet TV receiver which is provided with a screen combining unit instead of the display mode changer 14 for simultaneous displaying both of TV broadcasting and Internet information on two screens.

Next, the operation of software associated with processing of Internet information by CPU will be described in reference to FIG. 15.

FIG. 15 is a block diagram representing operations implemented by a software for explaining one example of the software operation related to the process of Internet information by a CPU. Operational examples of software are shown, for example, in "INTERFACE", pp. 131–135, issued on June, 1996. FIG. 15 is a flowchart depicting the software as a flow of operations associated with the contents of the publication.

When the circuit is connected to the Internet, the communication protocol process of the modem is executed for Internet information by a modem controller 41 which is equivalent to the modem 22. The output data of the modem controller 41 is transferred to a network processor 42. Normally, the Internet information is transmitted as per a protocol so-called as TCP/IP (Transmission Control Protocol/Internet Protocol). Therefor, the network processor 42 executes processes based on the TCP/IP to extract the Internet information from packets. The extracted Internet information is the applied to an HTTP processor 43.

There are several hundred protocols on the Internet and data of the WWW contents (files existing in servers on the WWW) described in a language called HTML (Hyper Text Markup Language) are exchanged as per an HTTP (Hyper Text Transfer Protocol). The HTTP is a stateless protocol designed for high speed transmission of documents.

Therefore, an HTTP processor 43 extracts HTML from HTTP and then transfer it to an HTML analyzer 44. In the HTML analyzer 44, a grammatical analysis of HTML is executed, prescribed data are decoded and developed data are supplied to a browser 45. The browser 45 arranges and displays the developed data. The actual layout display is achieved by the software process by the CPU 24 and the graphic controller 26.

According to the Internet TV described above, a signal processing system in a mode to display conventional TV program and a signal processing system in a mode to display Internet information are completely independent of each other. Further, there are cases that a user wishes to receive Internet information by connecting to the Internet, for instance, such cases that a user wishes to know detailed information on the cast of a TV program received by the user or a person or when a place wherein Internet information exists is introduced on a TV program by a URL (Universal Resource Locator) type notation ("http://www.Toshiba. . . . ", etc.) or when the user wishes to know detailed information as to an area where the program is filmed.

In these cases, the user needs to access a file on a server linked to the Internet after entering names of the casts, a name of program recording location, URL, etc. on a memo pad, a memory, etc. and entering them into an Internet TV receiver by an entry interface such as a keyboard, etc. There are problems that such an accessing operation is inconvenient for users and Internet information is not instantly received.

SUMMARY OF THE INVENTION

So, it is an object of the present invention to provide a multi-function TV receiver which is capable of executing processes related to objects which are transmitted in accompany with TV signals and objects which are utilized in the network including servers for improving utility value and achieving convenience.

In order to achieve the above object, a multi-function TV receiver according to one aspect of the present invention include a communication means for receiving a first object data which is transmitted in accompany with TV signals, object receiving means which is assigned to a channel separated from the first communication means and is capable of receiving a second object data, and linking means for linking the first object data of the first communication means with the second object data.

As it is possible to link the access to the second object by the linking means using the control information included in the first object data, a user is able to easily view displays of the information of the first object and the information of the second object.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 7 is a diagram showing an object by data structure and a diagram showing a memory map of a memory card;

DESCRIPTION OF THE PREFERRED EMBODIMENTS

The present invention will be described in detail with reference to the FIGS. 1 through 13.

Figure 1:
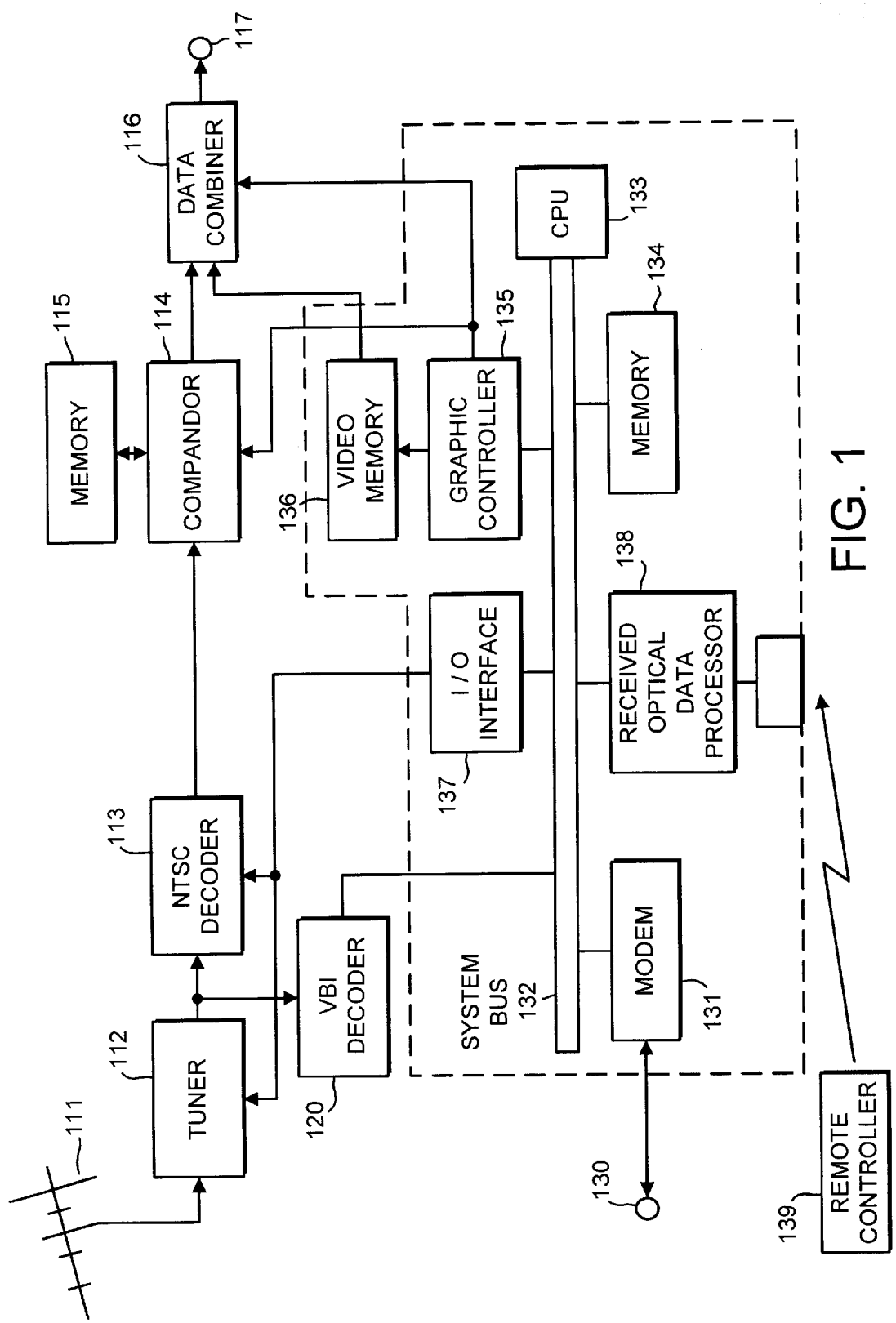
FIG. 1 is a block diagram showing a first embodiment of the present invention.

FIG. 1 is a block diagram showing one embodiment of the present invention. In FIG. 1, TV signals transmitted with broadcast wave are received to a receiving antenna 111. The channel of the received signal is selected by a tuner 112, and then the selected channel signal is demodulated. Baseband signals obtained by the demodulation comply with, for instance, the NTSC format in Japan. The baseband signals are applied to an NTSC decoder 113 where the signals are decoded and converted to luminance and chrominance signals.

The output of the NTSC decoder 113 is sent to a compandor (compression/expansion processor) 114. The compandor 114 compresses or expands pictures in the horizontal and/or vertical directions using a memory 115 so that they are possible to be displayed at desired display positions. A control signal for the picture compression and expansion is given from a graphic controller 135 which is described later.

A picture signal output from the compandor 114 is supplied to a data combiner 116, wherein the picture signal is combined with another picture signal output from a video memory 136 (described later). Thus the combined picture signal is output through an output terminal 117. The output picture signal of the output terminal 117 is displayed on a display unit which uses a CRT or liquid crystal, etc.

Further, the output signal of the tuner 112 is also applied to a VBI data decoder 120.

VBI data decoder 120 decodes data broadcasting signals which are multiplexed on the vertical blanking interval (VBI). In the data broadcast signals, teletext signals, such supplemental data which are transmitted for supplementing a current broadcast program are included. As the supplemental data, there are available various data intended by broadcasting stations. They are, for instance, the cast of a drama, supplemental sentences explaining displayed landscapes, supplemental picture data (still picture, moving picture), audio data, text data explaining commodities, etc., an order receiver of commodity, phone number data of the order receiver, layout control data for controlling picture layout positions on the screen, a script to interactively process transmitted data, etc. and these supplemental data become the first object data.

In this specification, data composed of a script (program) to be executed by a processor such as CPU, etc. and such resources as a data required for executing the script are defined as "Object Data".

All the first object data are once stored in a RAM. Data explained hereinafter are the first object data which are especially related to the linking with the Internet. This first object data are able to contribute to connection with Internet service providers through public lines such as telephone lines etc. in response to the remote control operation, which includes such data processing as packet data preparation, transferring, etc.

The construction of conventional TV receiver is as described above. In the case of a the multi-function TV receiver, the viewing of conventional TV programs and Internet information are correlated to each other. That is, the first object data transmitted using VBI has an automatic access command to automatically access addresses including URL, etc. wherein the Internet contents exist.

In case of a multi-function TV receiver of this embodiment, when the first object data having the automatic access command are received, a modem 131 is connected to the Internet through auto-dialing to pre-registered Internet service provider by the linking operation of a CPU 133. Then the TV receiver accesses the server on the Internet so as to capture the Internet information.

Thus, the user is able to receive the Internet information automatically. The Internet information received through an input terminal 130 is applied to the modem 131. The modem 131 is able to receive or transmit data through such public lines as telephone lines, ISDN (Integrated Services Digital Network), CATV cable, etc. The modem 131 is connected to a system bus 132 and receives and transmits data under the control of the CPU 133. The CPU 133 carries out data processings and controllings of circuit blocks based on a stored program, i.e., software in a memory (including ROMs and RAMs) 134. If the decoded data is for a display control, the CPU 133 supplies the data to a graphic controller 135. The graphic controller 135 outputs video signals as pictures through the video memory 136 and supplies to the data combiner 116.

The system bus 132 is connected with an input/output interface (I/O interface) 137. The selection of broadcasting channel, adjustment of picture quality, etc. is possible to be made through the I/O interface 137.

In addition, the system bus 132 is also connected with a received optical data processor 138. The received optical data processor 138 receives and processes signals transmitted in response to the operation of a remote controller 139 and supplies the received control signal to the control terminals of the tuner 112, the NTSC decoder 113, etc. Thus, the user is able to select the system operating functions through operations on his remote controller. Further, it is also possible to control the entire system through the remote controller 139, the CPU 133 and the graphic controller 135. For instance, it is possible to control the execution or cancellation of the picture compression/expansion process.

Figure 2:
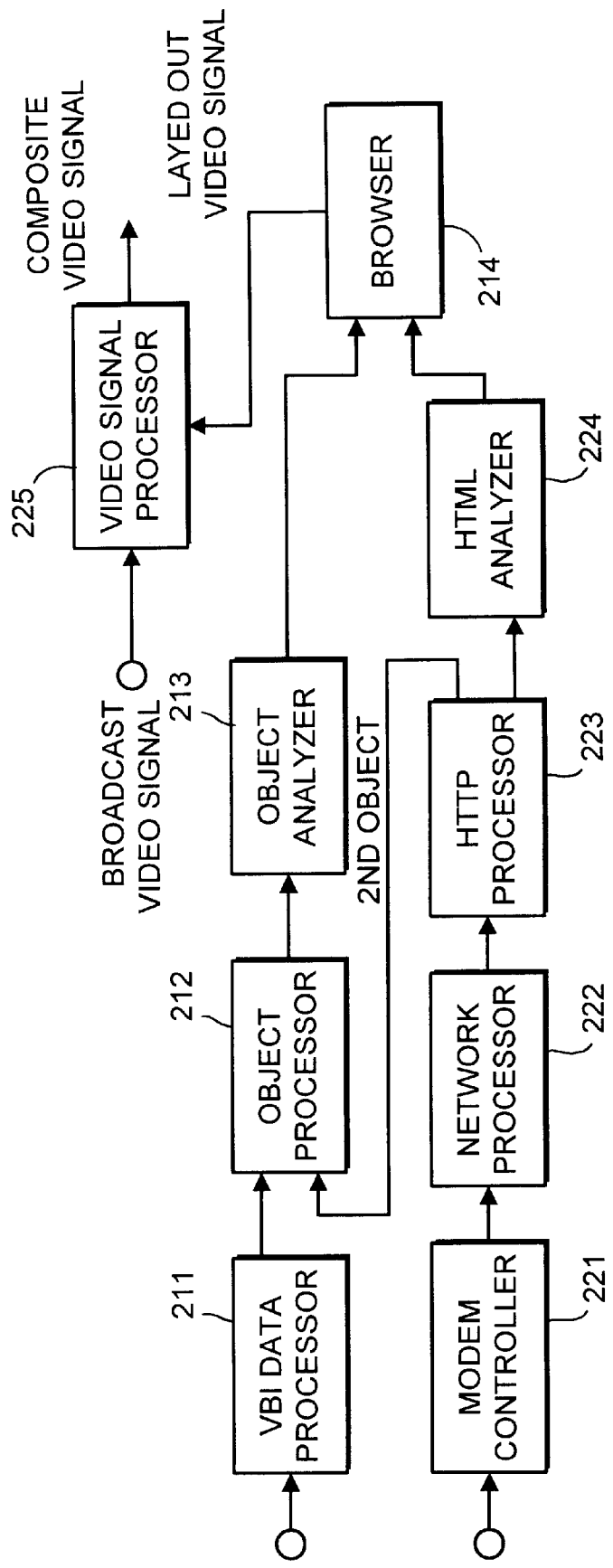
FIG. 2 is a block diagram for explaining one operation of the system as shown in FIG. 1.

FIG. 2 is a block diagram shown for explaining one operation of an Internet TV receiver in the construction as described above. The diagram illustrates operations implemented in software.

The data broadcasting signals multiplexed on the vertical blanking interval (VBI) are supplied to a VBI data processor 211 from the VBI data decoder 120. In the VBI data processor 211, the first object (added with an error correction code so that no error is generated if the distortion is generated in the transmission channel) is extracted and applied with the error correcting process, etc. This is possible by using, for instance, a teletext protocol and an error correction program. The first object applied with the error correction is supplied to an object processor 212.

In the object processor 212, the object protocol process is executed and an object is output to an object interpreter 213.

In the object interpreter 213, such Internet information included in the object as still picture data, text data, audio data, layout control data for controlling picture layout positions on the screen, etc., a script for interactively processing received data, etc. are developed and supplied to a browser 214.

On the other hand, when the circuit is connected to the Internet by an automatic access command included in the first object, the modem communication protocol process is executed for the Internet information by a modem controller 221 which is equivalent to the modem 131. The output data of the modem controller 221 is transmitted to a network processor 222.

As the communication is carried out by a protocol which is called TCP/IP (Transmission Control Protocol/Internet Protocol), the Internet information is processed as per the TCP/IP in the network processor 222 and the Internet information included in the packets is extracted. The extracted Internet information is then supplied to an HTTP processor 223.

The WWW contents are described in a language HTML (Hyper Text Markup Language) and a protocol for receiving the WWW contents is HTTP (Hyper Text Transfer Protocol). Therefore, in the HTTP processor 223, HTML type Internet information is extracted by executing the process as per the HTTP and the supplied to an HTML analyzer 224.

The HTML analyzer 224 performs the HTML grammatical analysis on the supplied Internet information described in the original Internet HTML language, decodes prescribed data and supplies developed data to the browser 214. Further, in the HTTP processor 223, the second object which is described later is separated and extracted from packet communicated as per the HTTP and supplied to the object processor 212.

The browser 214 generates a video signal with layout information from the Internet information carried out the HTML grammatical analysis from the HTML analyzer 224 and data from the object interpreter 213 and supplies the video signal with the layout to a video signal processor 225.

The video signal processor 225 combines the broadcasting video signal transmitted as the conventional broadcasting signal and the video signal with layout from the browser 214 in response to the layout information and outputs as a combined video signal. The video signal processor 225 is equivalent to the compandor 114, the memory 115 and the data combiner 116 shown in FIG. 1.

Figure 3:
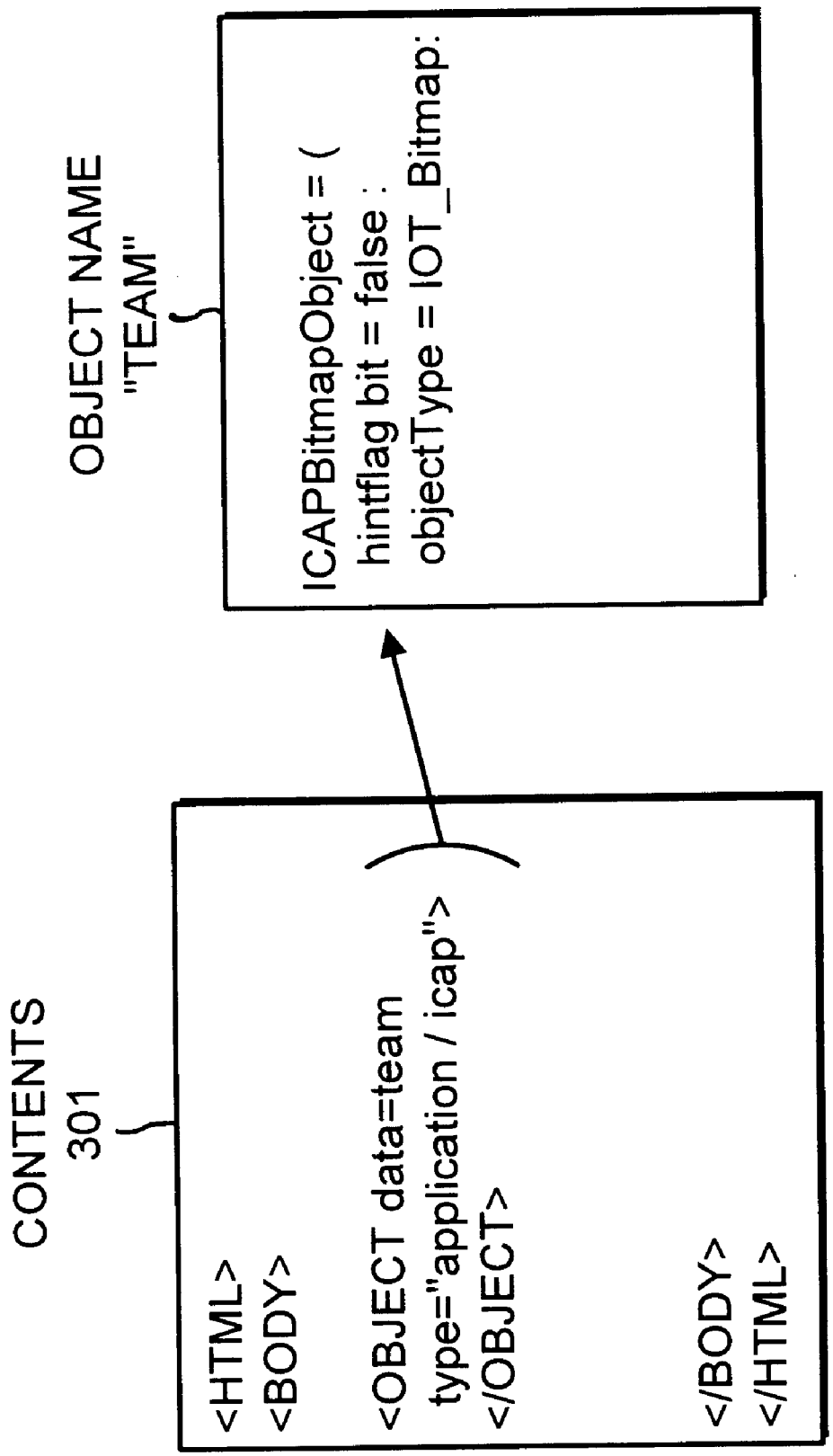
FIG. 3 is a diagram showing Internet contents and an object referred in this contents.

FIG. 3 is a diagram showing conventional Internet contents 301 written in the HTML language and a part of the second object having an object name: "Team" linked to the contents. The second object shown in FIG. 3 described directly data contents and if described in the data structure, it becomes what is shown in FIG. 7 (A) excluding server addresses (1) and (2). However, the second object may include server addresses.

As shown in FIG. 3, the contents 301 transmitted from Internet servers is written in the HTML language and information referring to the second object which is used specially in the multi-function TV receiver is embedded in a part of the contents. The portion presented by the form of <OBJECT data= . . . (interior parts omitted) . . . cap>+Line Feed Mark+</OBJECT> in FIG. 3 corresponds to the information referring to the second object. The portion <OBJECT data=Team type="application/icap"> of the information referring to the second object indicates that the OBJECT data is assigned with the object name "Team", while the OBJECT type is, for instance, "application/icap".

The Internet information written in the HTML language is orderly analyzed while detecting <HTML>, <BODY>, etc. enclosed by pre-determined tags (i.e., unequal marks "< >" shown in the drawing). Even when an object using tags which are expressly used in this invention had been freely embedded in the Internet contents, they are disregarded at the browser section of a conventional general purpose computer, etc. which is not able to recognize these tags. Thus a compatibility is preserved without occurring of any interference on the screen.

In the second object; "Team" referred in the contents 301, a definite script (program) and data are written and, for instance, they are possible to be recorded on the same directory of the same WWW server as a separate file from the contents 301. Further, the contents of description of the second object may be written between <OBJECT data= . . . > and </OBJECT> of the contents 301. In this embodiment, the contents of description of the second object will be explained continuously assuming that the contents are recorded in the same directory of the same WWW server in a separate file from the file of the contents 301.

Next, the operation of a multi-function TV receiver when the Internet contents 301 and the object; "Team" referred by the contents 301 are captured by an automatic access command included in the first object data will be explained.

When the Internet contents 301 and the object: "Team" referred in the contents 301 are captured, the HTTP processor 223 extracts the second object to provide it for the object processor 212. The object "Team" which is the second object shown in FIG. 3 is processed by the object processor 212 and the object interpreter 213.

In this embodiment, the object "Team" which is the second object data is explained to be supplied from the Internet through public lines such as telephone lines etc., but it may be transmitted through the broadcasting using VBI or may be provided in advance to a ROM of the memory 25 in a multi-function TV receiver. When provided in advance in the ROM, it is sufficient if an object name stored in a ROM of a multi-function TV receiver is referred in the Internet contents 301. For instance, regarding the general purpose second object which has a high frequency of use, if it is provided in advance in a ROM, it becomes possible to make a time required for receiving the second object short.

FIG. 4 and FIG. 5 are diagrams for explaining the operations when Internet contents are simultaneously displayed with programs for informing users the interim score of another game in response to the request of a broadcasting station.

Figure 4A:
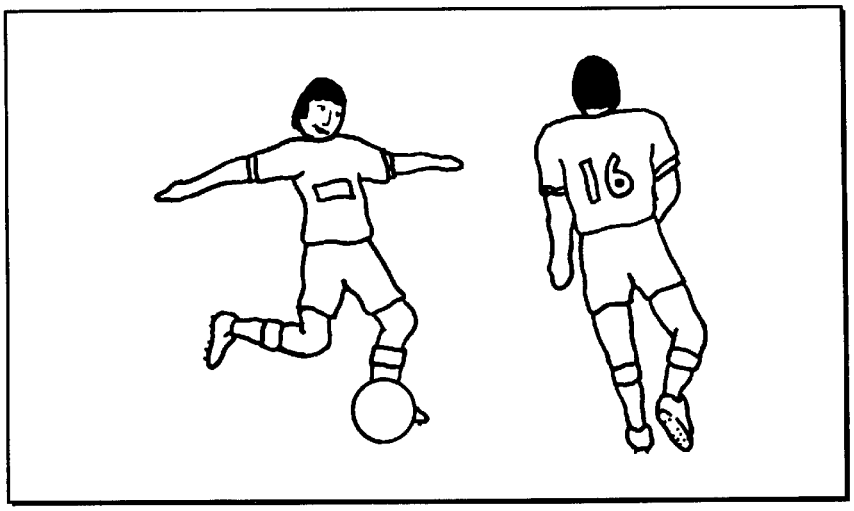
FIGS. 4(A) to 4(C) are diagrams showing displayed pictures showing for explaining the operating examples of the present invention.

FIG. 4(A) shows a picture (moving picture) when receiving a sport program, for instance, a soccer game program, and shows the situation wherein the first object having the automatic access command for gaining access to the Internet server was not broadcasted in the VBI and the correlation with the Internet was canceled. In this case, the compression/expansion process of pictures are not executed, while a display is carried out like the normal receiving state as conventional TV broadcasting.

Figure 4B:
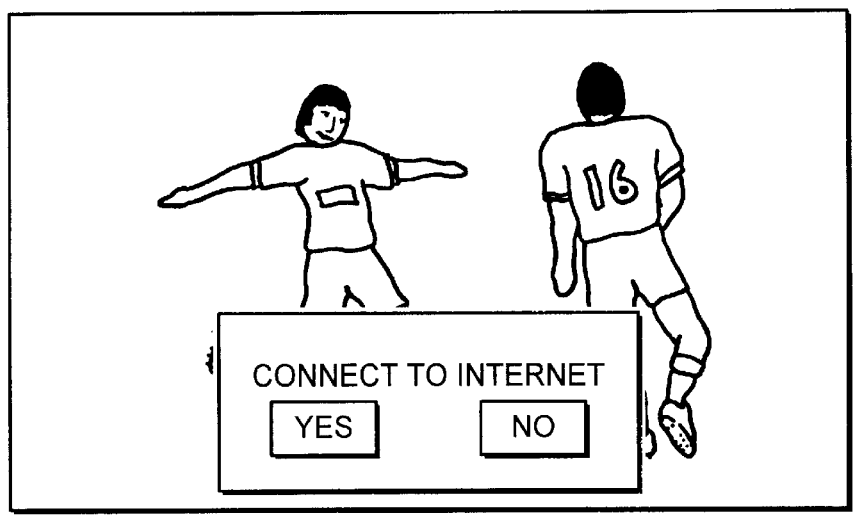

When a signal in which the VBI is superimposed by the first object including the automatic access command for accessing Internet server is received in the display state of FIG. 4(A), a multi-function TV receiver according to the present invention first displays a query to a user inquiring if he wishes to connect to the Internet as shown in FIG. 4(B) by the first object. The inquiring display to the user, as shown in FIG. 4(B), is accomplished by, for instance, the Inter-text broadcast started on October, 1996. A user is possible to transfer "YES" or "NO" message to a script (program) of the first object by operations of selectively pushing the "DECISION" button after putting the cursor on the "YES" or "NO" position by operating the "+" button on the remote controller 139. Details of these techniques will be omitted herein, as they have been obvious to those who have ordinary knowledge.

When a user selects "YES" button on the display as shown in FIG. 4(B) in wishing to connect to the Internet, the Internet server is automatically accessed in accordance with the automatic access command included in the first object data. As a result, a desired Internet content (i.e., a Web page showing the interim score of a soccer game) shown in FIG. 5(B) is displayed. Further, when a user does not wish to connect to the Internet and selects "NO", the video displayed by the first object disappears and the display returns to the display as shown in FIG. 4(A).

When the Internet contents shown in FIG. 5(B) are displayed, it is required to make the layout of the picture zone on the screen. Data for controlling the layout on the screen may be either the first object data transmitted on VBI or the second object data supplied from the Internet or the memory 134 as described in FIG. 2 and FIG. 3. These examples of display show a double-window screen of the currently watched sport program at the left half of the screen and the interim score of another game browsed on the Web page captured through the Internet at the right half.

When individuals in ordinary homes normally use the Internet, it is necessary to connect a TV receiver to the Internet via an Internet service provider through public lines such as telephone lines etc. However, if extremely many users call the circuit connection to the Internet service provider at the same time by the first object carried by the broadcast wave, the number of circuits compatible at the provider section and the restriction by circuit networks are limited and the connection to the Internet may not be possible in some cases.

Figure 4C:
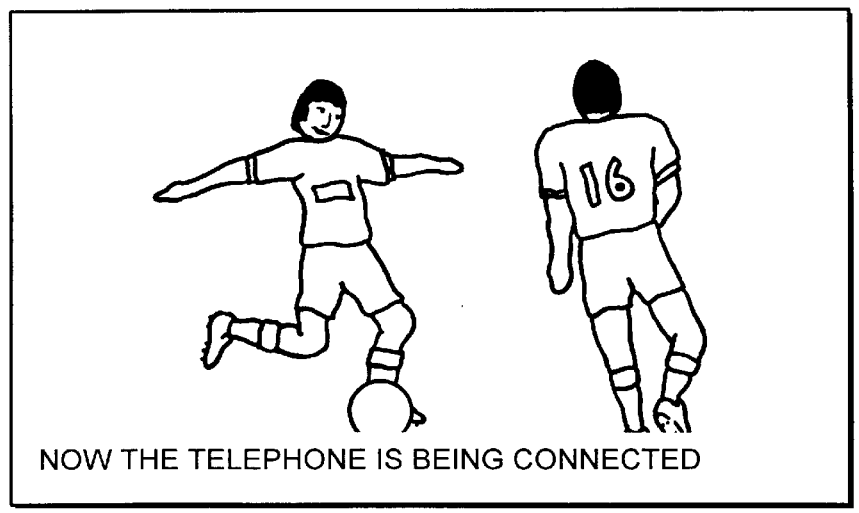

So, even when the picture layout information is transmitted for the first object which is transmitted in the VBI, for instance, until when the Internet service provider is connected by e.g., public lines, the layout remains unchanged and video of a soccer game is continuously displayed on the full screen and further, for instance, a character message "Now, the telephone line is being connected." is superimposed in small size at the bottom on the screen and is displayed as shown in FIG. 4(C). Then, after the public line is connected to an Internet service provider, the layout on the screen is changed and displayed as shown in FIG. 5(B).

Thus, until connected to an Internet service provider, a user is able to view an ordinary program by displaying it fully on the screen and is also able to recognize that an Internet service provider is being called for the circuit connection. In other words, there is no such a problem that a broadcasting video is displayed in small size although the Internet cannot be connected.

Figure 5A:
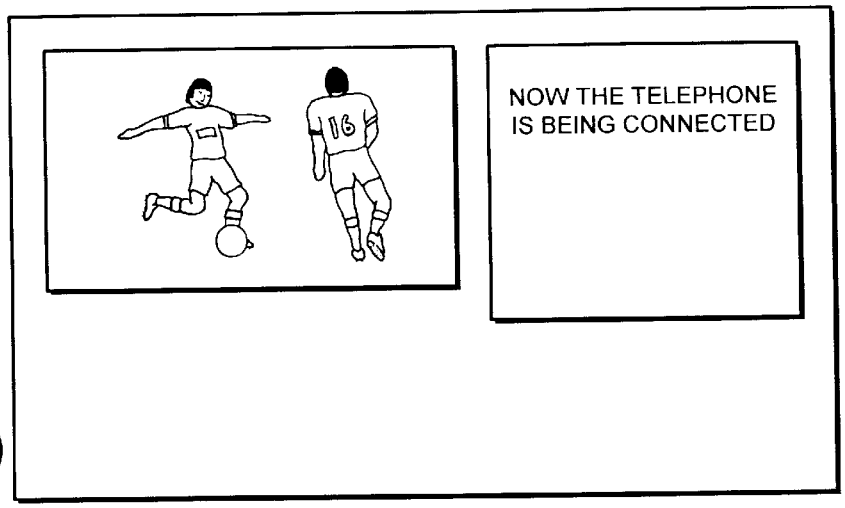
FIGS. 5(A) to 5(C) are diagrams showing displayed pictures showing for explaining the operating examples of the present invention.
Figure 5B:
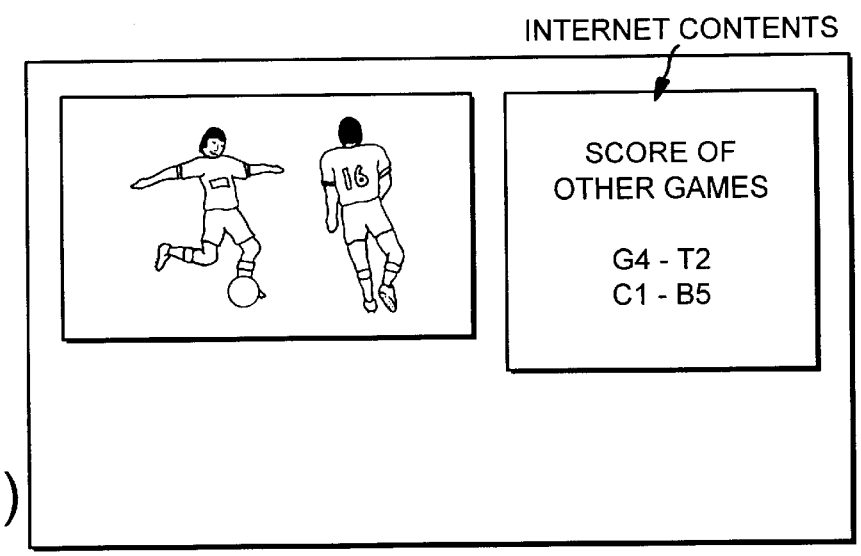

Further, a picture layout may be changed immediately after receiving a picture layout information and in this case, until such a time when a public line such as a telephone etc. is connected to an Internet service provided, a message indicating that the public line is in process of connection may be displayed in a frame wherein the Internet contents are displayed as shown in FIG. 5(A). Thus, a user is able to view a program in a picture layout intended by a broadcasting station side until the public line has been connected to an Internet service provider and also, able to recognize that the Internet service provider is being called for the circuit connection.

Further, the timing described above may be changed to the circuit connecting timing instead of a timing when an Internet service provider is connected. This is because some amount of time periods are normally required until a connection to an Internet server has completed still after the completion of the public line connection. Thus, a user is able to view a program on a large screen for a longer time.

As described above, a multi-function TV receiver of this invention has a function of automatically accessing Internet servers using an automatic access command included in the first object data multiplexed on the VBI and transmitted. Also, the TV receiver has functions of controlling the picture layout (size and display position) on the screen by the first and the second object data and inserting text data, still picture information included in the first or the second object data complying with the layout.

Although the multi-function TV receiver described above has accessed to Internet servers in the interaction manner with a user, as shown in FIG. 4(B), it is possible to automatically access Internet server by force without making inquiry as shown in FIG. 4(B). Thus, a user is able to save a time to select and decide by making an inquiry. The selection of connection to a public line for making the inquiry to a user as shown in FIG. 4(B) can be preset by the user. This is achieved in such a manner that a user first stores data indicating the authorization of circuit connection in the memory 134 in advance, and then detects whether the data authorizing the public line connection is stored in the memory 134 by the first object script and when stored, the circuit connecting operation is determined accordingly.

Figure 5C:
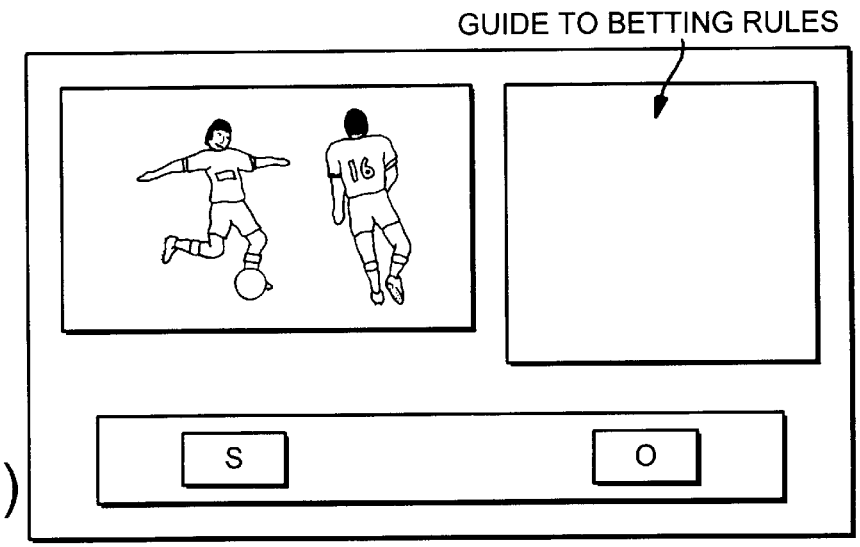

FIG. 5(C) shows an example of the display which the user is able to activate thereto at the state of display shown in FIG. 5(B). That is, this example is planned to be able to vote as to whether Team S or O wins in a soccer game presently being broadcasted. In this case, Internet server is accessible to by the first object data multiplexed on the VBI and transmitted. Thus, Internet contents are displayed at the right half of the screen.

The contents of the display is, for instance, "Vote as to which team S or O will win".

And the explanation for the operation to vote, for instance, a message "Operate either the Capital Letter of Team S or O shown at the lower section of the screen, which seems to win". Here, the votes on teams S, O by the operation following the previous Inter-text are transmitted to a server via the public line.

Figure 6:
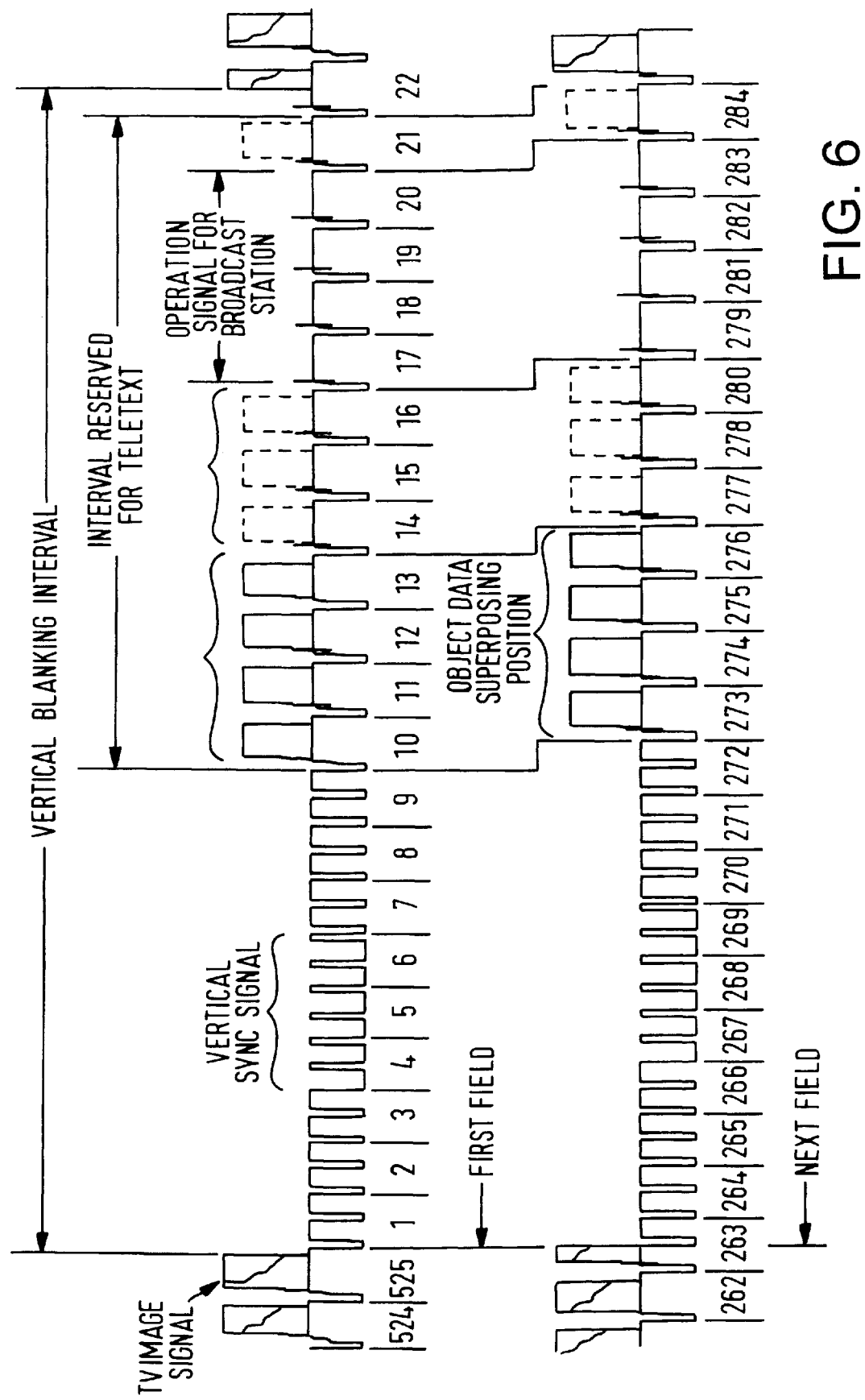
FIG. 6 is a diagram for explaining the first object position of the vertical blanking interval (VBI)

FIG. 6 indicates the multiplexed position of the first object. For transmission of the first object, the tenth line through the thirteenth line of the VBI and the 273rd line through the 276th line are used. It is possible to capture data of these lines by a VBI data decoder 120 and construct an object in the VBI data processor 211.

In this explanation, it was explained that the first object data is multiplexed on the VBI and transmitted. The present invention is also applicable to the digital broadcasting. In this case, it is only necessary that a broadcasting station side transmits the first object in a packet form as supplemental information for the currently received program; while a receiver section receives the first object transmitted in the packet form as supplemental information for the program. Further, when the first object is transmitted in independent from a program data and the first data includes information associated with the pocket of the first object for a supplemental data to the program, a receiving party is able to determine that the information is supplemental information of the program.

FIG. 7 is a diagram showing an example of the data format (data construction) of the first or the second object data. Normally, however, the second object has no information about server addresses.

A script which operates as a specific program software, text data, picture data (possible to be independently displayed by multiplexing on broadcast video images), layout control data for controlling picture layout as explained previously, server addresses (1), (2) including file names like URL, etc. are included in the object data. Handling of these data is determined by the contents written in a script form which is transmitted in accompany with the data. The actual data processing procedure on the basis of a script is determined in the object interpreter 213. Using the server addresses described above, it is possible to access Internet contents easily and correctly, which are related to a broadcasting program currently being received. Further, as an object in the same format as the object (i.e., the second object) is embedded in the Internet contents, it is possible to control or process the Internet contents by any script.

Figure 8:
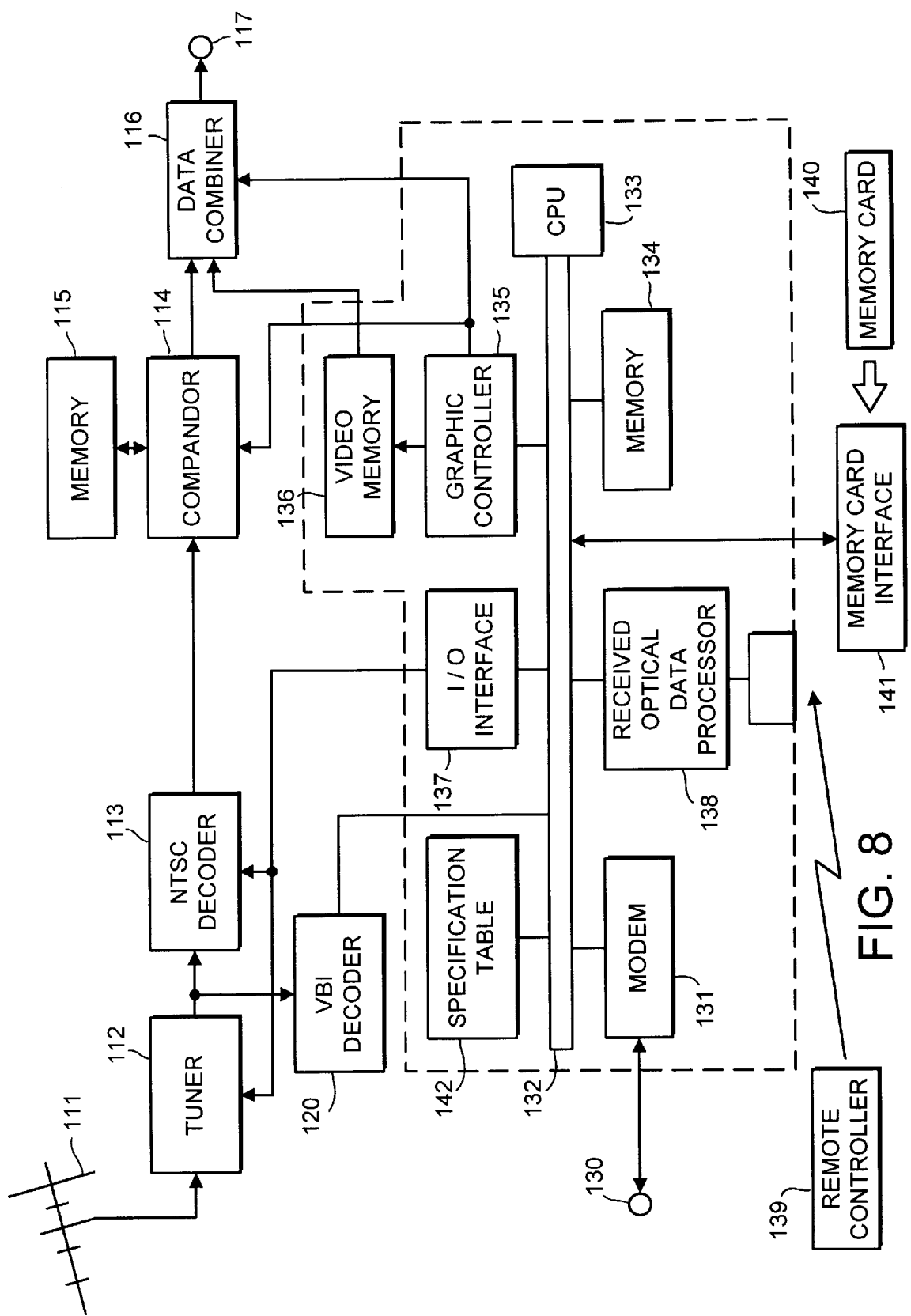
FIG. 8 is a block diagram showing another embodiment of the present invention.

FIG. 8 shows a multi-function TV receiver which is further capable of using a memory card 140. The memory card 140 is connected to the bus 132 via a memory card interface 141. A specification table 142 will be explained later in detail and all other portions are the same as the construction shown in FIG. 1 and therefore, the explanation thereof will be omitted. The memory card 140 is desirable to be an electrically writable and erasable non-volatile memory.

FIG. 7(B) is a diagram showing one example of the object data written on the memory card 140. In the preceding example, a server address is transmitted in accompany with the object data. So that a server is possible to be accessed based on the server address. After gaining access to a server, it may be desirable to access a linking destination hierarchically.

Depending to the manner that the WWW information is provided, in a case that information of the general outline or index of selling item is provided in the first layer (the first access of a server address), and then it is wished to know detailed contents of each item, the information is captured by accessing the address of a linking destination on the Internet, i.e., accessing the second layer.

Further, some Internet service provider may wish to give a security on an object carried in the VBI. In such a case, if a server address of an object carried on the VBI could be directly used, the security cannot be preserved.

So, in the system, the memory card 140 recording an object as shown in FIG. 7(B) is previously provided to users wishing to have the card, so that the card is possible to supplement the object as necessary.

The memory card 140 stores addresses of destinations linked to the corresponding button data. A user is able to access Internet server of the linking destination by selectively operating a corresponding button by a remote controller while looking the button indication displayed based on the button data.

Figure 9:
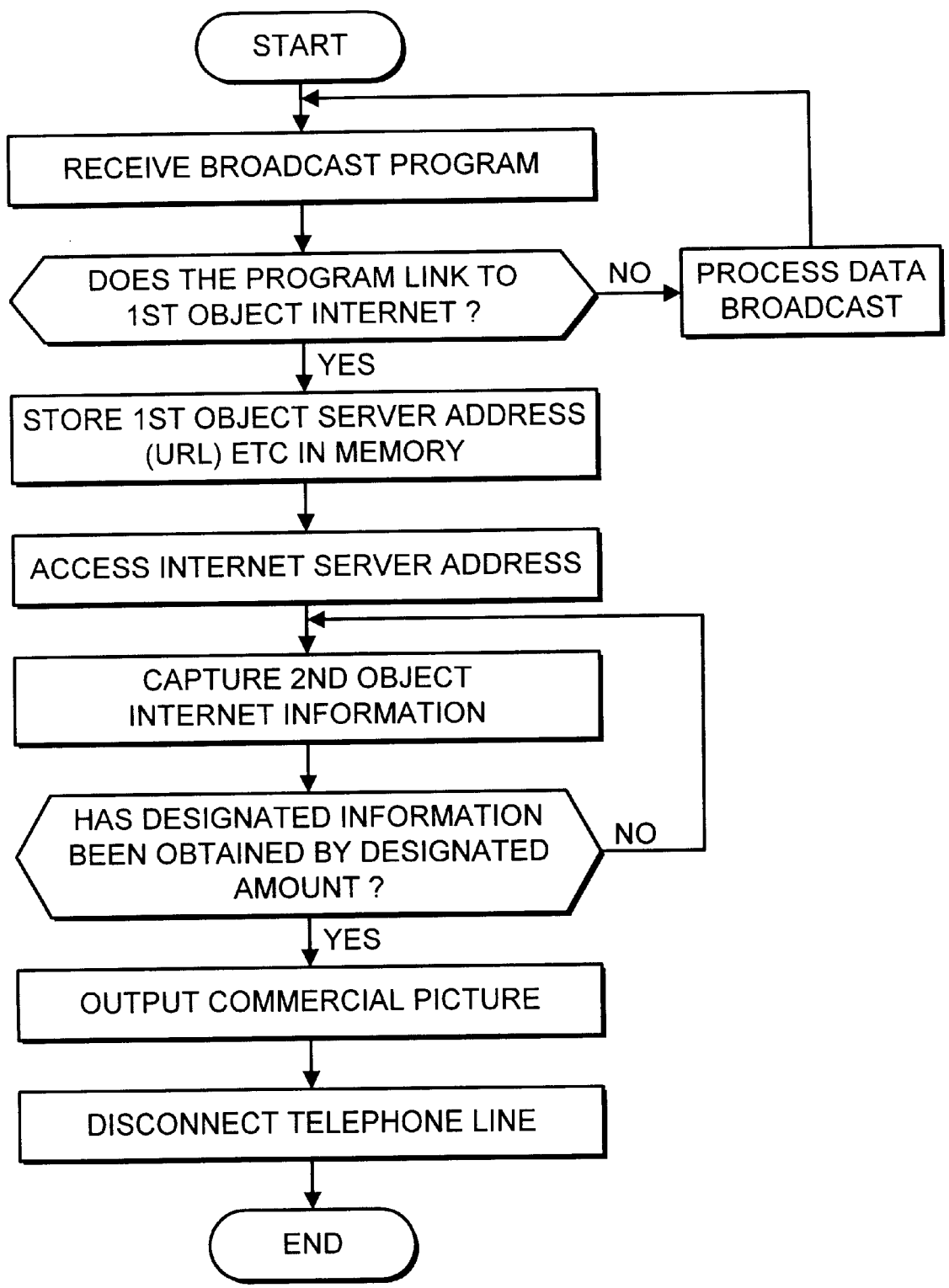
FIG. 9 is a flowchart for explaining the operating example of the system of the present invention.

Further, when data desirable to be stored in the memory card 140 are receive, they are possible to be stored in the data storage area in the memory card. The operation of the CPU at this time will be described in reference to FIG. 9. FIG. 9 shows a flowchart devised to prevent an oversight of commercials as a program sponsor displays Internet information by force on the TV receiver.

First, a broadcasting program including the first object is received and judged whether the object is related to Internet or not. When the object is not related to the Internet, another broadcasting program is received. When the program is related to Internet (YES), the first object (data supplementing a program, data unrelated to a program, server address, etc.) are stored in the data storage area in the memory card 140. When completing this reservation, the access to Internet is started using the server address by the modem 131. When all Internet information including the second object are acquired by the Internet access, they are displayed on the screen. When the designated commercial information is displayed, the Internet connection is turned OFF by force in order to save charges on usages of public lines such as a telephone line, etc.

When a preset period for running commercials has been over, the screen is automatically shifted to display a program on the full screen.

In this example, the server address is stored by force in the data storage area in the memory card 140. A script for displaying a button on the screen to inquire whether data are to be stored in the memory or not, prior to the storing operation or after commercial information has been displayed, may be included in the first object. Thus, server addresses are possible to be stored when so wished by a user. This inquiry is made by, for instance, Inter-text.

Thus, when a sponsor of a broadcasting program transmits own Internet server address (URL, etc.) in consonance with the commercials, a user is able to access the Internet any time using the server address stored in the data storage area in the memory card 140.

Further, in this example it is explained that server addresses are stored in the data storage area in the memory card 140 but they may be stored in a RAM in the memory 134.

Further, when information associated with Internet server addresses is included in the first object, it is possible to store server addresses in the memory without accessing the Internet. In this case, it is sufficient if the first object including a script to terminate a program when the first object shown in FIG. 9 is stored can be received. Thus server addresses are stored in the memory by force to the extent possible as the memory capacity is allowed without inquiring a user whether the addresses are stored after receiving the first object associated with Internet server addresses. Therefore the user is not required to answer frequently to the inquiry for preservation.

Further, when preserving addresses without making this inquiry, it may be so designed to automatically erase old server addresses stored in the memory if addresses are stored up to the full capacity of the memory. As a result, it becomes possible to always store the currently receiving server addresses in a memory. By comparing time stamps stored in accompany with the first object, it is possible to judge as to whether addresses are old or new. As to a method of erasing data when a memory is filled to capacity, server addresses which a user has voluntarily accessed by reading the memory after the memory has been stored with data, can be preferentially treated so as not to be erased. While addresses accessed by the user can be erased from the oldest to the newest when the memory has been filled to capacity.

In the above description, it is explained that the object data recorded in the memory card 140 will supplement or complement the first or the second object data transmitted by the VBI or the Internet. In this case, it is needless to say that the first and the second object data are in the relationship to complement each other. For instance, when picture data carried on the VBI is stored and used by the object data transmitted via the Internet, information brought from the Internet can be reduced and therefore, the accessing speed can be made fast. Further, when displaying a picture, the control is made under the script at the receiver section and it is therefore possible to control animations, etc. and provide the highly entertaining display.

Further, the first and the second objects can be replaced each other partially or entirely. That is, the access of the Internet server is first executed in response to the object multiplexed on the VBI. Then, when the contact with a server is completed, the object from the server will assume the leadership. This is effectual, for instance, when a sponsor of a broadcast program wishes to provide his own commercials exclusively to a user.

Next, a specification table 142 shown in FIG. 8 will be described in detail.

The Internet TV receiver is provided with the specification table 142 and the CPU 133 is able to judge its contents. The specification table 142 is a memory for storing data concerning various functions retained by the TV receiver itself.

The information retained by this specification table 142 is used as follows. For instance, the type of display may be specified by the Internet or VBI object. For instance, there may exist servers who transmit information by assuming that the screen is divided into many areas and information of the contents is displayed in each area. That is, there exist contents which are provided to utilize all of the functions of the latest model of TV receivers and control data for layout. In these cases, a TV receiver which has an ability of dividing screen into only two areas is not able to respond to the display requests from such servers. So, the TV receiver is provided with the specification table 142 to assign priorities on pictures to be displayed in the order of descending priority as per the specification and display pictures.

That is, the CPU 133 judges the layout control data for controlling the picture layout on the screen, compares with the contents of the specification table 142 and if the picture process corresponding to the layout control data (for instance, the multi-picture display for more than 3 pictures) is possible, executes the control data. However, if the picture process (the multi-picture display for more than 3 pictures) cannot be achieved and only two pictures are displayed, the CPU 133 operates to display two picture data by preferentially selecting them.

Further, in case of a TV receiver having only the ability of dividing screen into two areas, it is possible to superimpose text data, etc. on a program video image.

In addition, such TV receivers having many tuners are developed and a script which commands use of videos received by a plurality of tuners may be transmitted. In such a case, a TV receiver having not many tuners will make the most of the best function that the TV receiver can be expressed by it self in reference to the specification table 142.

A script to operate the CPU 133 can be originally stored in a program ROM in the TV receiver but may be transmitted with the first or the second object.

Figure 10:
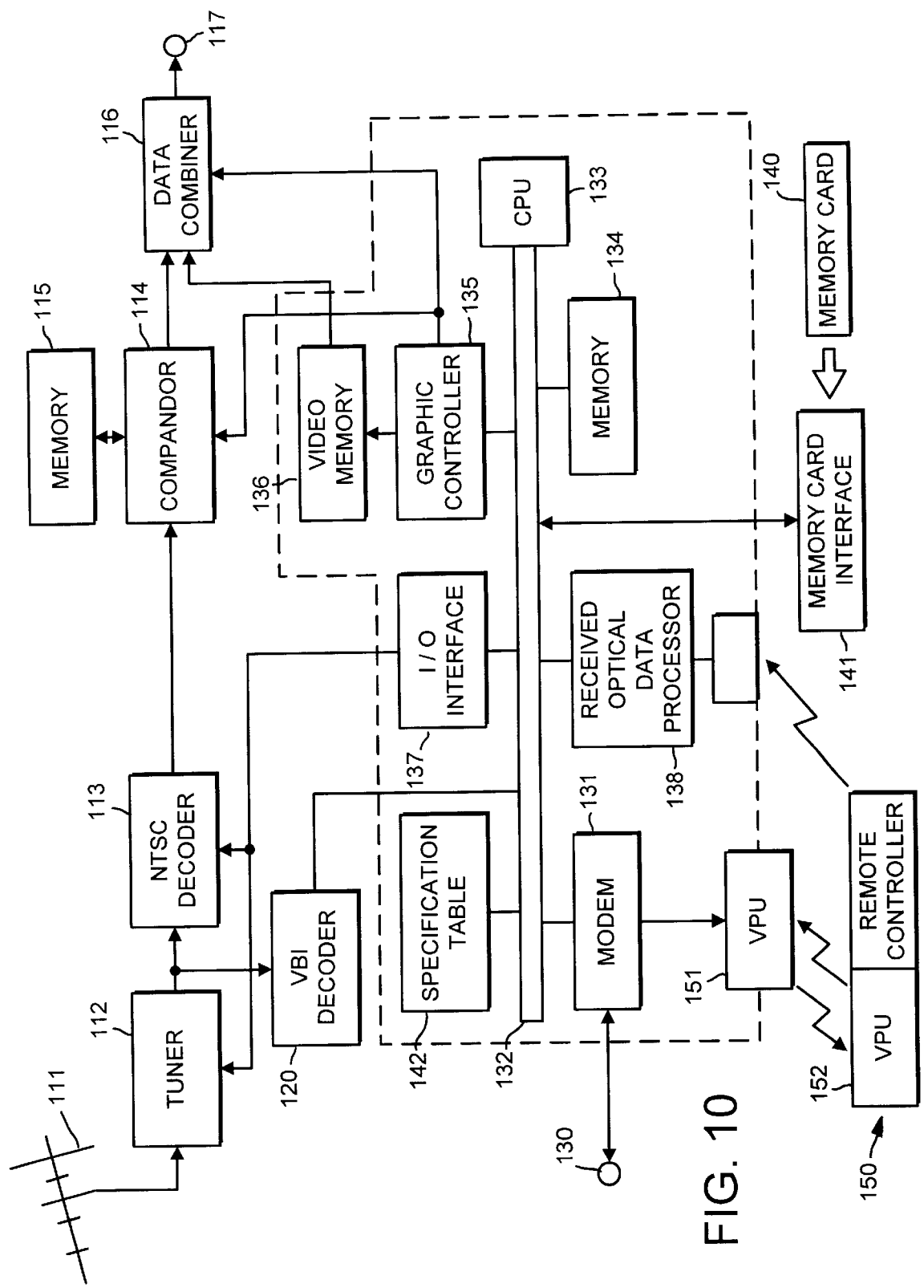
FIG. 10 is a block diagram showing another embodiment of the present invention.

FIG. 10 is a block diagram showing another embodiment of the present invention. The same component elements as those of the preceding embodiment will be assigned with the same reference numerals. The TV receiver is connected to a public line such as a telephone line etc. and the automatic dialing is possible likewise the preceding embodiment. So, the remote controller itself is designed to operate as a portable telephone 150 in such a form as a wireless extension set of a master telephone set. The telephone mode and TV operating mode can be selected by the key operation of the remote controller or the portable telephone 150. Further, the microphone and the speaker on the remote controller are separated in the longitudinal direction of the controller.

When a calling telephone number is entered on the remote controller in the telephone mode, it is possible to make a telephone call. The buttons for entering the telephone number are also shared with channel selector buttons for a TV receiver. Thus, it is not required to increase the number of buttons and numerical figures may not be erroneously pushed. "1"–"12" buttons are provided for the channel selection and phone number "0" is solved by commonly using the broadcasting channel 10.

When the telephone line is connected, the telephone line is transferred to a voice processing unit (VPU) 151 from the modem 131. The VPU 151 has the function of conventional extension telephones. Further, the VPU 151 is connected wirelessly to a VPU (voice processing unit) 152 at the remote controller or the portable telephone 150 section and it becomes possible to talk with a called person.

Further, when a certain time passes after the remote controller or the portable telephone 150 is set in the telephone mode, it is changed to the TV operating mode. This is because the telephone is normally used immediately but the channel selection of a TV receiver is operated only when changing a channel occasionally, and thus, when pushing the channel selecting button of the remote controller to change a channel, it is not judged to have the telephone number button pushed and a channel can be changed correctly. This is because the telephone is normally used immediately but the channel selection of a TV receiver is operated only when changing a channel occasionally, and thus, when pushing the channel selecting button of the remote controller to change a channel, it is not judged to have the telephone number button pushed and a channel can be changed correctly.

On the other hand, at the TV receiver section, the CPU 133 has an ability of detecting a telephone call. When there is a telephone call, the modem 131 is automatically connected to the VPU 151 section and a telephone incoming sound is transferred to the voice processor of a TV receiver (not shown) via the I/O interface 137. This TV receiver is so designed that a call alerting tone is given from its speaker by actuating a sound circuit when there is a telephone call even when a program is not viewed. Further, on the contrary, it is also possible to give a telephone incoming sound from the remote controller or the portable telephone 150 by transmitting a signal to notify the telephone incoming to the remote controller or the portable telephone 150 from the VPU 151. According to this, even when the remote controller is lost in a room, the position of the remote controller can be detected by calling own home telephone.

Further, if a TV receiver is used to view a program at this time, the audio output from a tuner of a TV receiver is automatically controlled to reduce its volume or make zero. Thus, a user is able to easily recognize a bell tone (i.e., a call alerting tone) of the telephone. Then, a user is able to reliably recognize that a telephone call has arrived. Further, to sound the telephone incoming sound from a TV receiver section, it is desirable to always keep the size of incoming sound at a constant level irrespective of the set volume of the TV receiver. This can be achieved by providing a circuit for multiplexing the telephone incoming sound after an audio amplifier of a TV receiver.

In the embodiment described above, the VPUs 151, 152 are provided to the TV receiver and the remote controller for the wired or wireless voice receiving and transmission. According to the above construction, it is necessary to provide only a microphone and voice transmission means for the voice processor 152 at the remote controller section. It is also necessary to provide only a voice receiving means for the VPU 151 connected to the modem 131 of the TV receiver section. In this case, it is sufficient that the volume level of voice output of a TV receiver can be automatically set at a prescribed level. Thus, a telephone voice is always output at a constant level. When a further adjustment is desired, it is sufficient to adjust the sound of a TV receiver through the remote controller.

Figure 11:
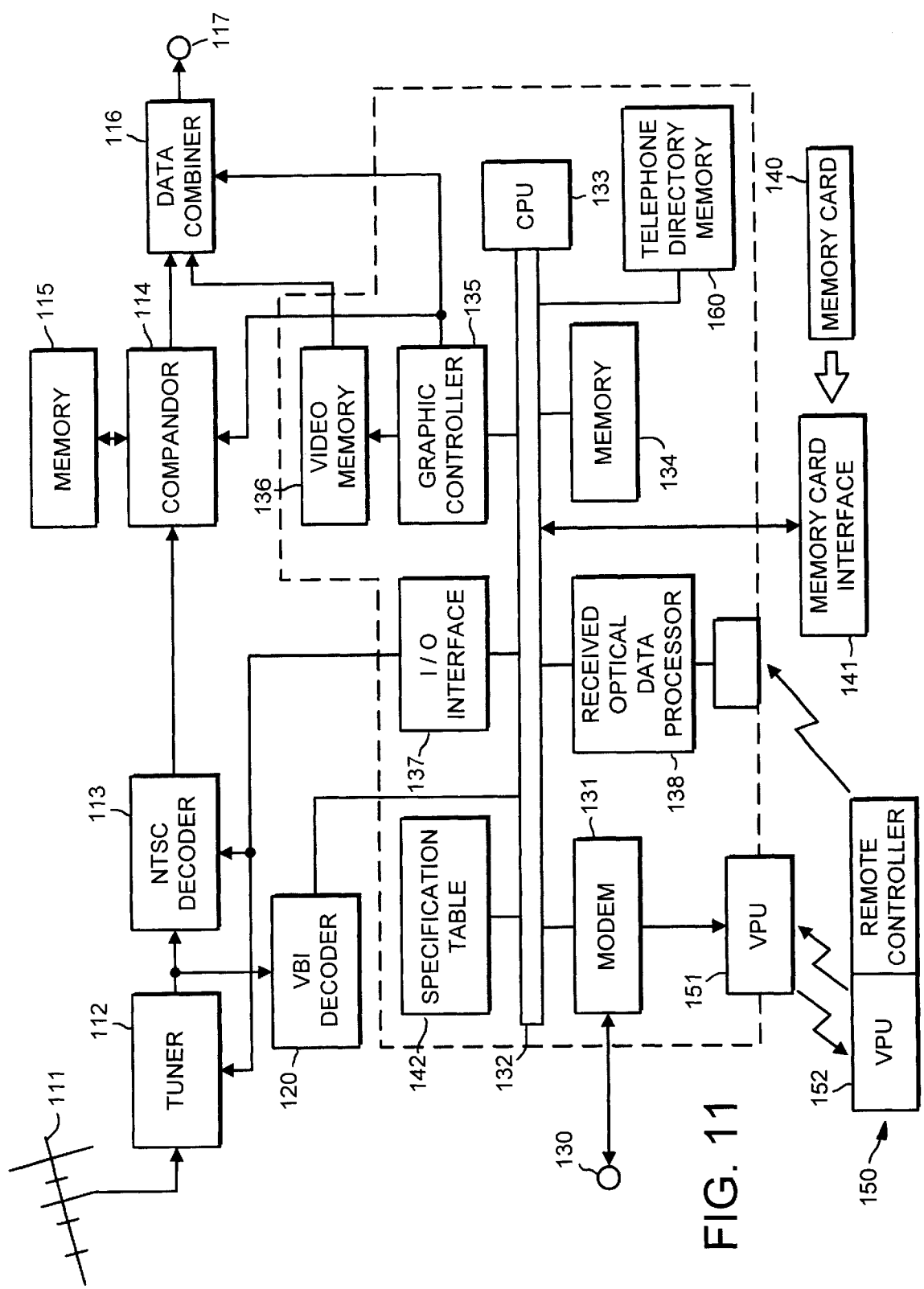
FIG. 11 is a block diagram showing another embodiment of the present invention.

FIG. 11 is a block diagram showing another embodiment of the present invention. The same component elements as those in the preceding embodiment are assigned with the same reference numerals.

This TV receiver is further provided with a telephone directory memory 160 for preserving distant access information. Telephone numbers (shop names or personal names, etc.) transmitted while multiplexed on VBI are recorded in the prescribed format in the telephone directory memory 160. To record telephone numbers, etc. in the telephone directory memory 160, when, for instance, a superposed text message such as "the telephone number is available to memory" is received during the program broadcasting by a script or text data and therefore, a user can store the telephone number in the memory by operating the prescribed keys. The above function is useful for on-line sales service, etc. and the erroneous pushing of telephone numbers can be prevented. The function of recording telephone numbers, etc. is updated to the latest one in response to a user's operation. For instance, if a telephone number is changed in spite of the same called person, the new telephone number is stored by updating the old number. Thus, latest telephone numbers are always registered in the telephone directory memory.

When data recorded in the telephone directory memory 160 become closer to the full capacity of the memory, a user is automatically inquired and data not required and having a low using frequency can be deleted. After registration, it is possible to sort registered telephone numbers for easy retrieval by an automatic sorting program using capital letters of names (e.g., store names) as a sorting key. Further, it may be so set that after registered, data are automatically sorted, thus saving a time of operation by a user to sort telephone numbers every time.

Further, telephone numbers and other information recorded in the telephone directory memory 160 can be read out and displayed on a display of a TV receiver when necessary for selection by a user to correctly call an objective person. As one example, when the telephone function is operated by setting the remote controller in the telephone mode for a user to make a telephone call, a registered telephone number list is first displayed on the display of a TV receiver. Here, by operating the up and down keys provided on the remote controller, a desired telephone number can be selected by the selection key from the list. Further, if any numerical key which is also used for TV channel selection when a telephone number list is being displayed, the telephone mode is changed to the unlisted telephone number entry mode and it becomes possible to make a telephone call to an unregistered person. Further, telephone numbers can be registered in accompany with data of calling persons originally in addition to telephone numbers derived from VBI.

The above example describes the function of recording telephone numbers, etc. directly in the telephone directory memory 160 but not restricted to the WWW addresses which are carried by multiplexing on the VBI may be registered like a telephone directory. In this case, after registered, it is also possible to sort them using capital letters of names (shop names) as a sorting factor according to an automatic sorting program for facilitating the easy retrieval. It is also possible to sort them automatically after registration.

The telephone function provided to the remote controller 150 and the telephone directory memory 100 may be optionally increased. Further, the telephone directory memory 160 may be shared with the memory card 140 as described above.

Further, in another embodiment of the present invention, it is able to have a function of automatic answering telephones. Such an automatic answering telephone has an ability of automatically record messages given by a calling party when there is an incoming telephone call. When set in this mode, the CPU 133 is put in the telephone waiting state. When there is a telephone incoming, the CPU is able to store a prescribed time of a message from a calling person in a memory 134. In this case, the data processor (the portion enclosed by the broken line) is always ON and kept in the waiting state.

When there is an automatic answering telephone after set in the automatic answering telephone mode and thereafter a user turns on the power for enabling the TV function of a TV receiver, the CPU 133 judges whether there is automatically answered and recorded data and if there exists the automatically answered and recorded data in the memory 134, the graphic controller 135 is controlled to display an icon or a message on the screen. Thus, a user is able to recognize that there was an automatic answering and recording.

Further, when the power of the TV receiver is turned ON and the telephone is set in the automatic answering telephone mode, the display is provided functions of displaying an icon or a message indicating the receipt of calls on the automatic answering telephone.

Further, when the TV receiver has a video telephone function, the bus 132 is coupled to receive a signal from a camera unit, and another party has also the same video telephone function, a picture image registered in the memory 134 is transmitted to the calling party during the operation of the automatic answering telephone, while a message from the calling party may be stored in the storage area of the memory 134. At this time, it is desirable to change pictures for transmitting to the calling party in response with a date, a day of the week, a time zone, etc. associated with reception of the telephone call.

Further, the system has an increased capacity of memory for previously storing information necessary for receiving following TV programs at the first object through the Internet. That is, in the first object the next program and its associated servers have been found, unless the channel has been changed. Therefore, during the reception of current TV program a server address for the next program is transmitted and data acquired from the server are stored to be kept in waiting for reception of the next program. Thus, when progressed to the next program, required Internet information has been already acquired, so that commercials, questions, etc. can be displayed without awaiting time and it is able to success the connection with broadcast programs.

Figure 12:
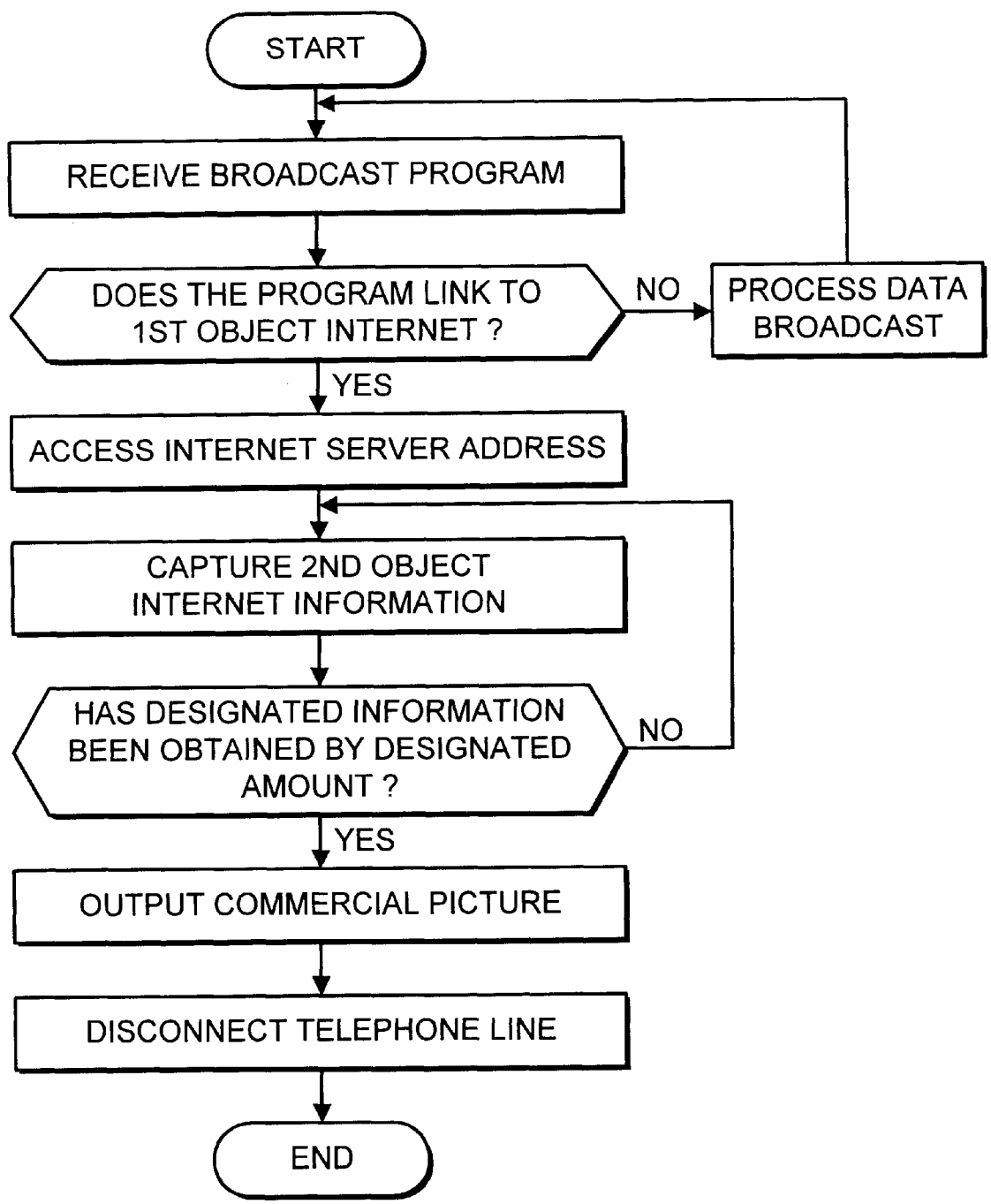
FIG. 12 is a flowchart for explaining the operating example of the system of the present invention.

FIG. 12 shows a flowchart of an operation devised for eliminating oversight of commercials on the TV receiver as described above, wherein a program sponsor forces to display pictures of Internet information. When the designated commercial information is displayed, the Internet is disconnected by force in order to save charges to public lines such as telephone lines.

When the predetermined period for running commercials has been over, the display automatically returns to the former full-screen image display.

Figure 13:
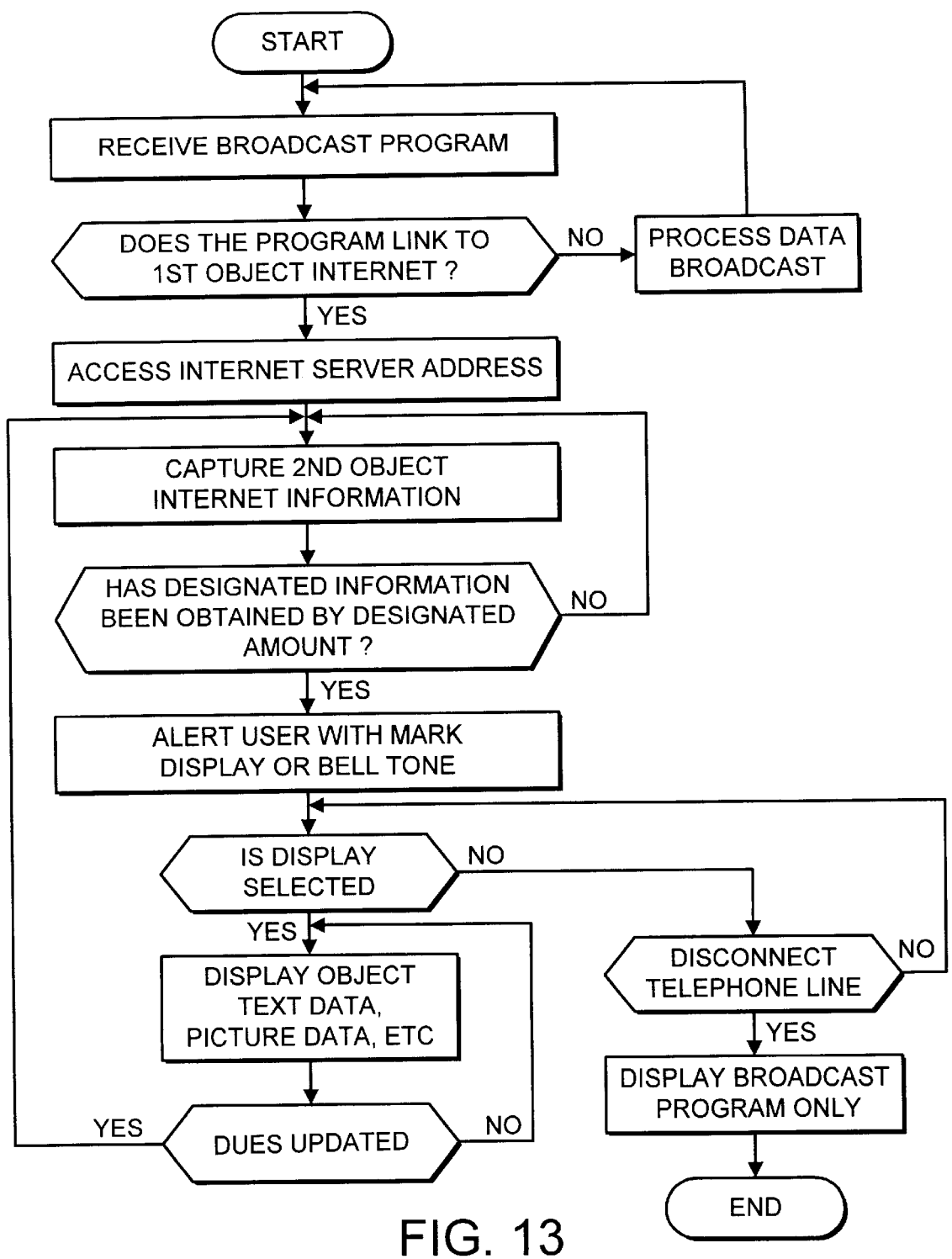
FIG. 13 is a flowchart for explaining the another operating example of the system of the present invention.
Figure 14:
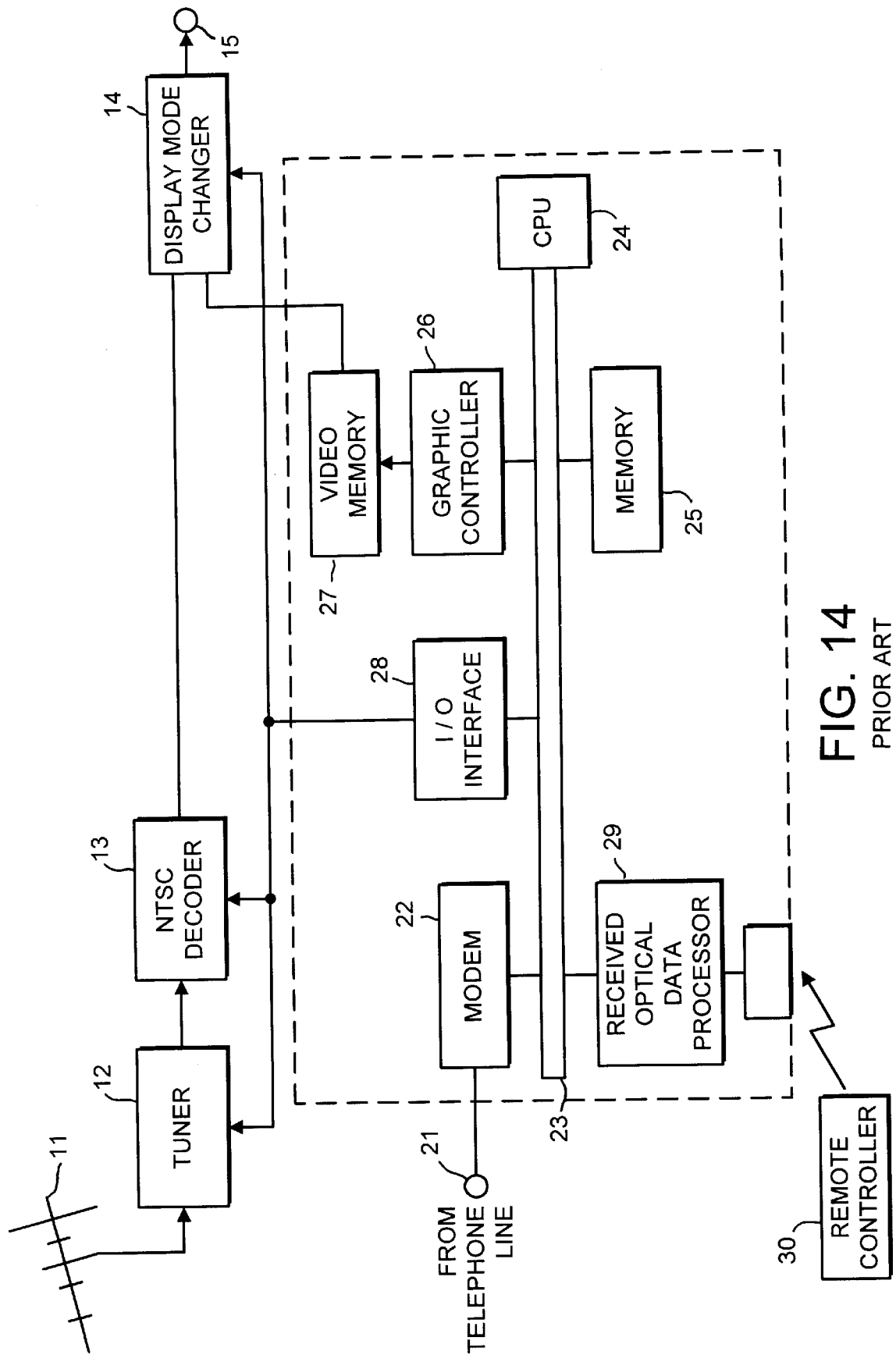
FIG. 14 is a block diagram showing the construction of a conventional Internet television.
Figure 15:
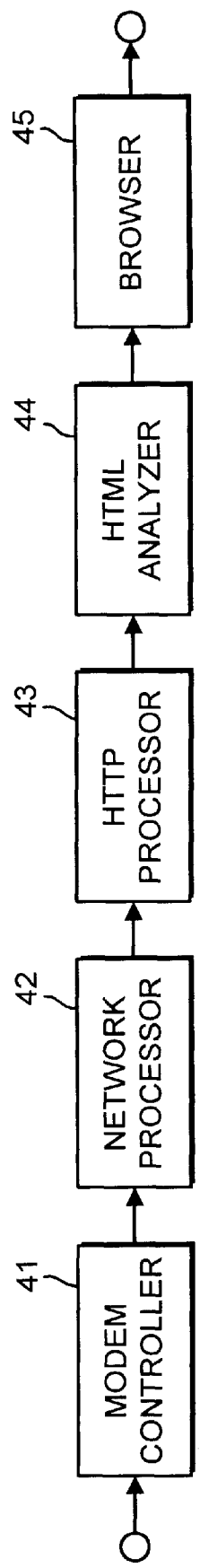
FIG. 15 is a block diagram for explaining one operating example related to the Internet information processing of the system shown in FIG. 14.

FIG. 13 shows a flowchart of an operation wherein a display mode selection is left to the user, without displaying the Internet information by force. For instance, such an operation is performed in some cases where the contents of video conversation are provided to handicapped persons or those who study languages through superimposed dialogues offered by various languages. In these cases, it is more advantageous to allow a user to select the superimposed dialogue transmitted through the Internet rather than through the broadcasting. In such a case, it will be better that a user is able to select to display data or not at his pleasure. In this case, it will be also better that a user is able to turn off the Internet circuit at his intention.

In the above explanation, the first object is transmitted in association with programs. However, the first object is not necessarily related to programs. That is, any object is acceptable if it is connected to the Internet according to the first object so as that the object can be simultaneously displayed with a broadcast assigned by the Internet information.

As described above, the present invention can provide an extremely preferable multi-function TV receiver, which is possible to link an object transmitted through a broadcast with another object obtained through any accessible means other than broadcast. Thus the present invention can increase the usefulness and the convenience of the multi-function TV receiver for both users and broadcast service providers.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims different in scope from the following claims, which different claims may be adopted subsequently during prosecution, for example, for the purposes of a divisional application.

What is claimed is:

1. A multi-function TV receiver comprising:
   first communication means disposed along a first signal path and structured for (i) receiving TV broadcast signals transmitted from a first signal source and (ii) extracting a first object data from the transmitted TV broadcast signals, the first object data including and internet access command;

second communication means disposed along a second signal path and structured for (i) receiving internet information signals, the internet information signals being based upon the internet access command (ii) extracting second object data from the received internet information signals, the second object data being used in a network including servers and being provided for accessing the network;

wherein the first and second object data have matching data formats, the matching data formats including at least one of a script, text data, picture data, layout control data, and a server address format; and linking means for linking the first object data of the first communication means with the second object data of the second communication means;

wherein the linking means has a function of displaying pictures in accordance with pre-set priorities, when picture layout information included in the first or the second object data for the display indicates the number of pictures (N), by comparing the number of pictures (N) with the number of pictures (M) records in an inherently owned specification table.

2. A multi-function TV receiver comprising:

communication means disposed along a first signal path and structured for (i) receiving TV broadcast signals transmitted from a first signal source and (ii) extracting first object data from the transmitted TV broadcast signals, the first object data including an internet access command;

data capturing means disposed along a second signal path and structured for (i) receiving internet information signals, the internet information signals being based upon the internet access command and (ii) extracting second object data from the received internet information signals;

wherein the first and second object data have matching data formats, the matching data formats including at least one of a script, text data, picture data, layout control data, and a server address format; and linking means for linking the first object data with the second object data;

wherein the linking means has a function of displaying pictures in accordance with pre-set priorities, when picture layout information included in the first or the second object data for the display indicates the number of pictures (N), by comparing the number of pictures (N) with the number of pictures (M) records in an inherently owned specification table, and if N>M.

* * * * *